3,773,794
BIS-CHROMONES
Albert Chambers, Peter Bennett Johnson, and Thomas Brian Lee, Loughborough, England, assignors to Fisons Limited, London, England
No Drawing. Filed July 23, 1971, Ser. No. 165,694
Int. Cl. C07d 7/34
U.S. Cl. 260—345.2    10 Claims

ABSTRACT OF THE DISCLOSURE

There are disclosed doubly linked bis-chromones of Formula I,

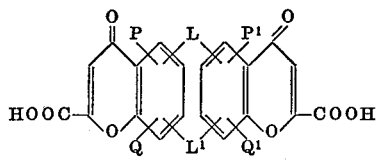

in which

L and $L^1$, which may be the same or different, each represent a single bond, a single linking atom, or a group —OXO—, in which X represents an alkylene chain containing from 1 to 6 carbon atoms and which may optionally be substituted by a —OH group, and P, Q, $P^1$ and $Q^1$, which may be the same or different, are each hydrogen, alkyl, halogen, hydroxy, alkenyl, phenyl or alkoxy, the alkoxy optionally being substituted by alkoxy, hydroxy or a heterocyclic ring containing carbon and oxygen, the alkyl, alkenyl alkoxy and substituted alkoxy groups containing from 1 to 8 carbon atoms, and pharmaceutically acceptable derivatives thereof. Processes for making the compounds of Formula I and pharmaceutical compositions containing them are also disclosed. The compounds of Formula I are indicated for use in the treatment of asthma.

---

This invention relates to new chromone-2-carboxylic acids, their preparation and compositions containing them.

According to our invention we provide compounds of Formula I,

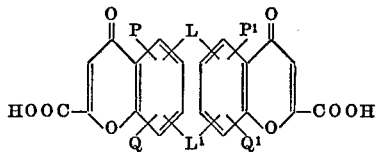

in which

L and $L^1$, which may be the same or different, each represent a single bond, a single linking atom, or a group —OXO—, in which X represents an alkylene chain containing from 1 to 6 carbon atoms and which may optionally be substituted by a —OH group, and P, Q, $P^1$ and $Q^1$, which may be the same or different, are each hydrogen, alkyl, halogen, hydroxy, alkenyl, phenyl or alkoxy, the alkoxy optionally being substituted by alkoxy, hydroxy, or a heterocyclic ring containing carbon and oxygen, the alkyl, alkenyl alkoxy and substituted alkoxy groups containing from 1 to 8 carbon atoms, and pharmaceutically acceptable derivatives thereof.

According to our invention we also provide a process for the production of a compound of Formula I, which comprises (a) Cyclising a compound of Formula II,

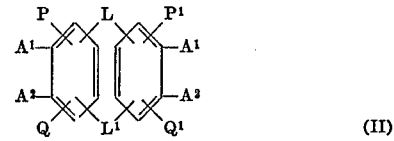

in which P, Q, $P^1$, $Q^1$, L and $L^1$ are as defined above and the pairs of groups $A^1$, $A^2$ each represent a chain

—CO—CH=C(COOH)—O— or the pairs of groups (i)   —COCH$_2$COCOR$^6$ and —OM or (ii)  —H and —O—C(COOM)=CHCOOM at least one of the pairs of groups $A^1$, $A^2$ being other than a —CO—CH=C(COOH)—O— chain, $R^6$ is a —OM group or a group hydrolysable thereto, and M is hydrogen or an alkali metal, and if desired or necessary hydrolysing the resulting compound to a compound of Formula I, (b) Hydrolysing or oxidising a compound of Formula VI,

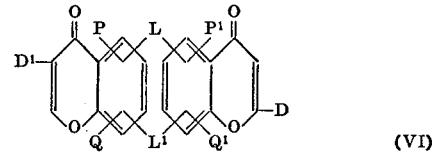

in which

P, Q, $P^1$, $Q^1$, L and $L^1$ are as defined above,

D is a group which is hydrolysable or oxidisable respectively to a —COOH group, and $D^1$ is a —COOH group or a group D, or (c) Selectively dehydrogenating a compound of Formula VII,

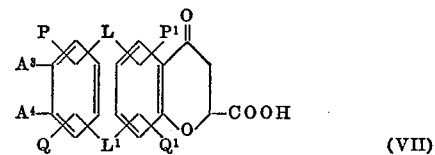

or an ester thereof, in which

P, Q, $P^1$, $Q^1$, L and $L^1$ are as defined above, and $A^3$ and $A^4$ together represent a chain

—COCH$_2$CH(COOH)—O— or an ester thereof, or —COCH=C(COOH)—O— or an ester thereof, and if desired or necessary converting the resulting ester to a compound of Formula I.

The cyclisation of process (a) (i) may be carried out by heating, or under basic or neutral conditions. It is however preferred to carry out the cyclisation in the presence of an acid, e.g. hydrochloric acid, and in a solvent which is inert under the reaction conditions. The reaction may be carried out at from about 20° C. to 150° C. The group —COR$^6$ is preferably an ester group.

The cyclisation of process (a) (ii) may be carried out by treating the compound of Formula II with a cyclising agent, for example a dehydrating agent such as polyphosphoric, chlorosulphonic or sulphuric acid. The reaction is preferably carried out under anhydrous conditions. Alternatively cyclisation may be achieved by converting the free carboxy groups of the compound of Formula II to acyl halide, e.g. acylchloride, groups and subjecting the resulting acyl halide to an intramolecular Friedel-Crafts reaction.

In process (b) the group D may be an ester, amide or nitrile group, each of which may be hydrolysed to a —COOH group. The hydrolysis may be carried out using conventional techniques, for example an ester may be hydrolysed using a base, e.g. sodium hydroxide, carbonate or bicarbonate, in an aqueous alcoholic medium. The amide may be hydrolysed under acidic conditions, e.g. by refluxing in a solution of hydrogen bromide in acetic acid. The nitrile likewise may be hydrolysed under acidic conditions, e.g. by refluxing in a solution of hydrogen chloride in dioxan. Alternatively the group D may be an alkyl, e.g. methyl, an aralkenyl, e.g. styryl, an acyl, e.g. acetyl, or an aldehyde, e.g. formyl group. The oxidation may be carried out using conventional techniques, for example an alkyl group may be oxidised using selenium dioxide, e.g. under reflux in aqueous dioxan, or chromic acid, e.g. under reflux in aqueous acetic acid. Aralkenyl groups may be oxidised using, for example neutral or alkaline potassium permanganate in aqueous ethanol and acyl groups may be oxidised using, for example chromic acid or an aqueous hypochlorite, e.g. sodium hypochloride. Aldehyde groups may be oxidised using, for example chromic acid or silver oxide.

The dehydrogenation of process (c) may be carried out by oxidation using, for example selenium dioxide, palladium black or chloranil in a solvent which is inert under the reaction conditions, e.g. amyl alcohol; the reaction is preferably carried out at an elevated temperature, e.g. under reflux. Alternatively the dehydrogenation may be carried out indirectly by halogenation followed by dehydrohalogenation, for example by treatment with N-bromosuccinimide or pyridinium bromide perbromide in a solvent which is inert under the reaction conditions, followed by dehydrobromination of the resulting 3-bromo compound.

The compounds of Formula II, in which a pair of $A^1$ and $A^2$ represent the pair of groups —OM and

—COCH$_2$COCOR$^6$ may be made by reaction of a compound Formula III,

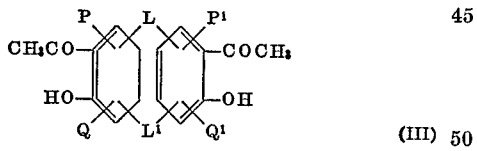

(III)

in which P, Q, P$^1$, Q$^1$, L and L$^1$ are as defined above, with a compound of Formula XII, $$R^1CZCZR^6 \quad (XII)$$

in which

R$^6$ is as defined above,

R$^1$ is a group reactive with a hydrogen in the —COCH$_3$ group of the compound of Formula III, e.g. an alkoxy group, each Z is a carbonyl oxygen atom, or one Z may represent two halogen atoms and the other a carbonyl oxygen atom, and if necessary hydrolysing the resulting compound to a compound of Formula II.

The compounds of Formula III may be made by Fries rearrangement, i.e. heating in the presence of aluminium chloride, of a compound of Formula IV,

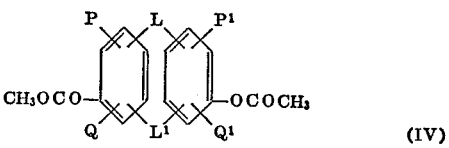

(IV)

in which P, Q, P$^1$, Q$^1$, L and L$^1$ are as defined above.

Alternatively the compounds of Formula III may be made by reacting a compound of Formula V,

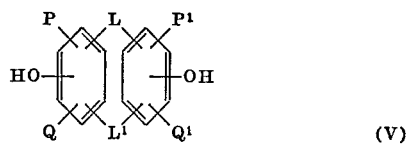

(V)

in which P, Q, P$^1$, Q$^1$, L and L$^1$ are as defined above, with an acetyl halide, e.g. acetyl chloride, under Friedel-Crafts reaction conditions, e.g. in the presence of aluminium chloride.

The compounds of Formula II, in which a pair of $A^1$ and $A^2$ represent the pair of groups —H and

—CO(COOM)=CH—COOM, may be made by reacting a compound of Formula VIII,

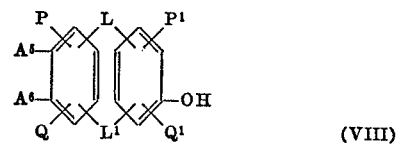

(VIII)

in which

P, Q, P$^1$, Q$^1$, L and L$^1$ are as defined above and $A^5$ and $A^6$ together form a chain

—COCH=C(COOH)—O— or $A^5$ is hydrogen and $A^6$ is a hydroxy group, with a dialkyl acetylene dicarboxylate, in conventional manner, followed if necessary by hydrolysis.

The compounds of Formula VI may be made in a manner analogous to process (a) (i) using a starting material of Formula IX,

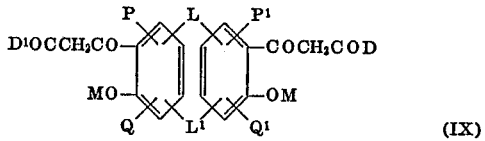

(IX)

in which P, Q, P$^1$, Q$^1$, L, L$^1$, D, D$^1$ and M are as defined above.

The compounds of Formula IX may be made from compounds of Formula III using known reagents and conventional techniques.

The compounds of Formula VI may, for example in the case of the ester, the amide and the nitrile, be made from compounds of Formula I, e.g. by esterification, reaction of the ester with ammonia to produce an amide, followed by dehydration of the amide to form the nitrile.

The compounds of Formula VII may be made by cyclisation of a compound of Formula X or XI,

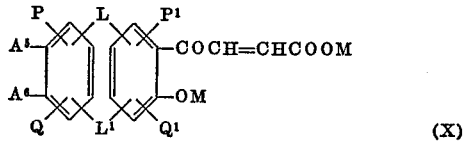

(X)

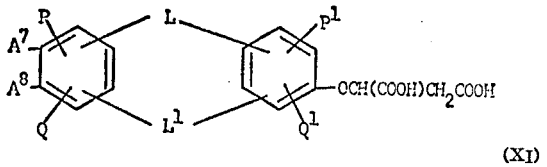

(XI)

in which

P, Q, P$^1$, L, L$^1$ and M are as defined above, $A^5$ and $A^6$ are a chain —COCH=C(COOH)—O—, or an ester thereof, a chain —COCH$_2$CHCOOH—O— or an ester thereof, or the pair of groups

—COCH=CHCOOM and —OM, and

A⁷ and A⁸ are a chain —COCH=C(COOH)—O— or an ester thereof, a chain —COCH₂CHCOOH—O— or an ester thereof, of the pair of groups —H and

—OCH(COOH)CH₂COOH

The compounds of Formula X may be cyclised under basic conditions, and the compounds of Formula XI under the conditions of process (a)(ii) above.

Compounds of Formula X may be made by reacting a compound of Formula III with glyoxalic acid or an ester thereof or by reacting a compound of Formula VIII with maleic anhydride. Compounds of Formula XI may be made by selective reduction of a compound of Formula II in which A¹ and A² represent —H and

—OC(COOH)=CHCOOH

Compounds of Formula VII may also be made by selective hydrogenation of an appropriate compound of Formula I.

The compounds of Formulas IV, V and VIII are either known or may be made from known compounds using conventional techniques.

The compounds of Formula I and the intermediates therefor may be recovered and purified using techniques conventional in the recovery and purification of similar known compounds.

The processes described above may produce the compound of Formula I or a derivative thereof. It is also within the scope of this invention to treat any derivatives so produced to liberate the free acid, or to convert one derivative into another. Suitable derivatives include salts, notably water-soluble salts; esters and amides of the carboxylic acid group and derivatives of any other functional groups which may be present. Salts which may be mentioned include acid addition salts, ammonium salts, amine salts, alkali-metal and alkaline-earth metal salts, notably sodium salts; esters include those derived from alcohols containing from 1 to 10 carbon atoms and aminoalkyl esters, for example a diethylaminoethyl or piperidinoethyl ester; and amides include those derived from ammonia, primary or secondary amines, amino acids, e.g. glycine and from alkyl aminoalkylamines, e.g. from diethylaminoethylamine or piperidinoethylamine.

According to a further feature of the invention we provide a process for the production of a pharmaceutically acceptable salt of a compound of Formula I which comprises treating a compound of Formula I, another salt thereof, or an ester or amide thereof with a compound containing a pharmaceutically acceptable cation, e.g. with an appropriate base, ion exchange resin, etc. or by a metathetical process with another salt. Preferred pharmaceutically acceptable salts are the sodium salts.

The compounds of Formula I, and pharmaceutically acceptable derivatives thereof are useful because they possess pharmacological activity in animals; in particular they are useful because they inhibit the release and/or action of pharmacological mediators which result from the in vivo combination of certain types of antibody and specific antigen, e.g. the combination of reaginic antibody with specific antigen (see Example A below). Thus the new compounds are indicated for use in the treatment of asthma, e.g. allergic asthma. The new compounds are also indicated for use in the treatment of so-called "intrinsic" asthma (in which no sensitivity to extrinsic antigen can be demonstrated). The new compounds may also be of value in the treatment of other conditions in which antigen-antibody reactions are responsible for disease, for example, hay fever and urticaria.

For the above mentioned uses the dosage administered will, of course, vary with the compound employed, the mode of administration and the treatment desired. However, in general, satisfactory results are obtained when the compounds are administered at a dosage of from 0.1 to 50 mg. per kg. of animal body weight in the test set out in Example A. For man the indicated dosage is in the range of from about 0.1 to 50 mg.

The compounds of Formula I, and pharmaceutically acceptable derivatives thereof, may be administered by conventional techniques, preferably in admixture with (a major proportion of) a pharmaceutically acceptable diluent or carrier. Specifically the compounds may be administered by inhalation as a liquid or powder composition, e.g. powder composition containing a diluent such as lactose, or oesophagally as a tablet or capsule, containing conventional fillers, binders, lubricants, flavourings, colourings, etc.

In the compounds of Formula I it is preferred that, L and L¹ are joined to adjacent (ortho) positions on the benzene nuclei. Furthermore, it is preferred that L and L¹ together with the 4 carbon atoms in the benzene nuclei to which they are attached, form a ring containing 10 or less, preferably 6 or less, members.

When L or L¹ is a single atom that atom may, as for example in the case of carbon, be attached to one or more atoms or groups, for example hydrogen atoms or lower alkyl groups, i.e. L or L¹ may be a methylene or a mono or di-lower alkyl methylene group. L or L¹ may also, if desired, represent an oxygen or a sulphur atom or an NH group. L or L¹ may also represent a group

—OCH₂CHOHCH₂O—

P, Q, P¹ and Q¹ are preferably all hydrogen.

The invention is illustrated, but in no way limited by the following examples in which parts are by weight unless otherwise stated.

EXAMPLE 1

Bis (2-carboxychromono[h])[6,7:10,9](3-hydroxy-1,5-dioxyacylodecane)

(a) 2,12 - diacetyl-1,7,13-trihydroxy-5,9-dioxadibenzo[f:i]cyclodecane: 4 parts of bis(3-acetyl-2,6-dihydroxyphenyl) methane were added to a solution of 0.5 part of sodium in 350 parts by volume of ethanol. To the solution were added 1.5 parts of epichlorohydrin and the mixture refluxed for 96 hours. Analysis of the product by T.L.C. showed a mixture of product and starting material. The reaction was, therefore, continued by refluxing for a further 72 hours, with successive addition of 0.2, 0.3 and 1 part of epichlorohydrin at 24 hour intervals. The solution was evaporated and the residues extracted with ether. The dried ether extracts, on evaporation, gave an oily residue. This oil was dissolved in hot ethanol and, on cooling, 0.9 part of 2,12 - diacetyl-1,7,13-trihydroxy-5,9-dioxadibenzo[f:i]cyclodecane separated out, M.P. 214–5° C.

Found (percent): C, 64.67; H, 5.28. C₂₀H₂₀O₇ requires (percent): C, 64.5; H, 5.4.

(b) Bis(2-ethoxycarbonylchromono[h])[6,7:10,9](3-hydroxy-1,5-dioxacylodecane): A solution of 0.93 part of 2,12 - diacetyl - 1,7,13 - trihydroxy-5,9-dioxadibenzo[f:i]cyclodecane in 2.3 parts of diethyl oxalate was added to a solution of 0.6 part of sodium in 30 parts by volume of ethanol. The mixture was refluxed for 5 hours. It was then poured into 300 parts by volume of ether and the products extracted with water. The aqueous layer was acidified and the products extracted into chloroform. The dried chloroform extracts on evaporation gave a yellow oil. This oil was boiled with about 15 parts of ethanol containing 0.3 part of hydrochloric acid for 15 minutes. The solution, on cooling, gave 1.1 parts of a solid which was a mixture of the bischromono compound as its ester and acid. The solid was dissolved in chloroform and the solution was washed with sodium bicarbonate solution. The dried chloroform extracts, on evaporation, gave 0.71 part of bis(2-ethoxycarbonylchromono[h])[6,7:10,9](3 - hydroxy-1,5-dioxacyclodecane), M.P. 222–6° C. raised to 224–6° C. (from ethanol).

Found (percent): C, 62.88; H, 4.4. $C_{28}H_{24}O_{11}$ requires (percent): C, 62.68; H, 4.47.

(c) Bis(2-carboxychromono[h])[6,7:10,9](3-hydroxy-1,5 - dioxyacyclodecane)disodium salt: 0.375 part of the ester was dissolved in a minimum of ethanol and 1.15 parts by volume of 1.17 N sodium hydroxide were added to the solution. The solution was heated for 15 minutes to cause complete hydrolysis of the ester. The solution was evaporated to dryness and water added. The resulting solution was charcoaled, filtered and freeze-dried to obtain the disodium salt of bis(2 - carboxychromono[h])[6,7:10,9](3-hydroxy-1,5-dioxacyclodecane).

EXAMPLE 2

2,9-dicarboxydichromono[7,6-b:6',7'-d]furan (a) 2,7-diacetoxydibenzofuran: A mixture of 4 parts of 2,7-dihydroxydibenzofuran, 10.2 parts of sodium acetate and 8.2 parts of acetic anhydride were heated at 100° for 6 hours. The mixture was then poured into water and the resulting solid filtered off. The solid was washed with water, sodium bicarbonate solution and water, dried and crystallised from dioxan to yield 1.6 parts of 2,7-diacetoxydibenzofuran, M.P. 142–144° C.

Found (percent): C, 68.0; H, 4.36. $C_{16}H_{12}O_5$ requires (percent): C, 67.6; H, 4.22.

(b) 3,6-diacetyl-2,7-dihydroxydibenzofuran: An intimate mixture of 1.42 parts of 2,7-diacetoxydibenzofuran, 4.1 parts of aluminium chloride and 0.88 part of sodium chloride was slowly heated to 145° C. and maintained at that temperature for 4 hours. After cooling and hydrolysis with ice and hydrochloric acid, the resulting solid was filtered off and washed well with water. It was dissolved in dilute sodium hydroxide solution which was then filtered and the filtrate acidified with hydrochloric acid. The resulting solid was filtered off, washed with water, dried and crystallised from dioxan to give 0.4 part of 3,6-diacetyl-2,7-dihydroxydibenzofuran as needles, M.P. 310° C.

Found (percent): C, 67.9; H, 4.29. $C_{16}H_{12}O_5$ requires (percent): C, 67.6; H, 4.22.

(c) 2,9 - diethoxycarbonyldichromono[7,6-b:6',7'-d] furan hemihydrate: 1.38 parts of sodium were dissolved in 50 parts of ethanol. To this was added a solution containing 4.26 parts of 3,6 - diacetyl-2,7-dihydroxydibenzofuran and 4.3 parts of diethyl oxalate dissolved in 270 parts of dioxan. The mixture was refluxed and stirred for 4 hours. After cooling, the mixture was poured into water and extracted with ether. The aqueous was acidified with concentrated hydrochloric acid with extracted with ether. The ethereal solution from the extraction of the acidified solution was washed with water, dried over sodium sulphate, filtered and evaporated to a semi solid which was refluxed in 100 parts of ethanol and 0.2 part of concentrated hydrochloric acid for 15 mintes. After cooling, the precipitated yellow solid was filtered off, dried and recrystallised from 50 parts of dioxan to give 0.9 part of 2,9 - diethoxycarbonyldichromono[7,6-b:6',7'-d]furan as the hemihydrate which melted at 303–4° C. with decomposition.

Found (percent): C, 63.1; H, 3.63. $C_{24}H_{16}O_9 \cdot \frac{1}{2}H_2O$ requires (percent): C, 63.0; H, 3.72.

(d) 2,9-dicarboxydichromono[7,6-b: 6',7'-d]furan dihydrate: 5.5 parts of 2,9-diethoxycarbonyldichromono[7,6-b:6',7'-d]furan hemihydrate was dissolved in 150 parts of dioxan and to this solution was added 2.1 parts of sodium bicarbonate. Water was then added until the sodium bicarbonate had dissolved and the resulting solution was heated on the steam bath for 2 hours. After this time, the mixture was evaporated to dryness and the resulting solid was dissolved in water and the solution filtered. The filtrate was acidified with concentrated hydrochloric acid and the gelatinous solid was filtered off, washed with water, ethanol and ether, and extracted wtih hot dioxan. Evaporation of the dioxan from the extracts gave 4.06 parts of 2,9-dicarboxydichromono[7,6-b:6',7'-d]furan as its dihydrate which melted above 340° C.

Found (percent): C, 56.1; H, 2.75. $C_{20}H_8O_9 2H_2O$ requires (percent): C, 56.07; H, 2.79.

(e) The disodium salt of 2,9 - dicarboxydichromono-[7,6-b:6',7'-d]furan: 4.06 parts of 2,9-dicarboxydichromono[7,6-b:6',7'-d]furan dihydrate and 1.58 parts of sodium bicarbonate were dissolved in water. The solution was filtered and freeze dried to give the disodium salt of 2,9-dicarboxydichromono[7,6-b:6',7'-d]furan.

EXAMPLE 3

2,9-dicarboxydichromono[7,6-b:6',7'-d]cyclopentane (a) 3,6-diacetyl - 2,7 - dihydroxyfluorene: An intimate mixture comprising 10 parts of 2,7-diacetoxy fluorene, 50 parts of anhydrous aluminium chloride and 10 parts of sodium chloride was heated at 145–155° C. for 3 hours.

After cooling, the mixture was hydrolysed with ice and hydrochloric acid to give a solid which was filtered off, washed with water and dissolved in dilute sodium hydroxide solution.

The alkaline solution was filtered and acidified with hydrochloric acid to give a solid which was filtered off, washed with water and dried. The compound was crystallised from dioxan as a yellow solid comprising 7 parts of 3,6-diacetyl-2,7-dihydroxy fluorene, M.P. 304–6° C.

*Analysis.*—Found (percent): C, 72.7; H, 4.84. $C_{17}H_{14}O_4$ requires (percent): C, 72.34; H, 4.96.

The structure was confirmed by nuclear magnetic resonance and mass spectroscopy.

(b) 2,9 - dicarboxydichromono[7,6-b:6',7'-d]cyclopentane hydrate: To a stirred solution of sodium ethoxide (prepared from 3.68 parts of sodium and 300 parts of ethanol) was added a slurry of 5.64 parts of 3,6-diacetyl-2,7-dihydroxy fluorene in 14.6 parts of diethyl oxalate and 200 parts of dry dioxan.

The mixture was stirred and refluxed for 4 hours, cooled, poured into water and extracted with diethyl ether.

The aqueous solution was acidified with hydrochloric acid and extracted with diethyl ether. The ethereal extracts were washed with water, dried over sodium sulphate and evaporated to give an oil which was dissolved in ethanol and boiled for 10 minutes with 2 drops of concentrated hydrochloric acid. The resulting yellow solid obtained from the cooled solution was filtered off and shown by Thin Layer Chromatography to be a mixture of chromone acid and ester.

To a boiling solution of 1.8 parts of the solid in ethanol were added 0.7 part of sodium bicarbonate. Water was then added until a clear solution was obtained. The solution was then boiled for 2 hours and the ethanol distilled. The remaining aqueous solution was cooled, filtered and acidified with hydrochloric acid to give 0.4 part of a light brown solid comprising 2,9-dicarboxydichromono[7,6 - b:6',7' - d]cyclopentane hydrate, M.P. 269–70° C.

*Analysis.* — Found (percent): C, 61.8; H, 3.12. $C_{21}H_{10}O_8 \cdot H_2O$ requires (percent): C, 61.8; H, 2.94.

(c) 2,9 - diethoxycarbonyl dichromono[7,6-b:6',7'-d] cyclopentane hemihydrate: To a suspension of 0.2 part of 2,9 - dicarboxydichromono[7,6-b:6',7'-d]cyclopentane hydrate in 100 parts of ethanol were added 0.4 part of concentrate sulphuric acid. The mixture was refluxed for 12 hours, filtered hot and cooled to give 0.1 part of a solid comprising 2,9 - diethoxycarbonyl dichromono-[7,6-b:6',7'-d]cyclopentane hemihydrate, M.P. 255° C.

*Analysis.* — Found (percent): C, 66.4; H, 4.18. $C_{25}H_{18}O_8 \cdot \frac{1}{2}H_2O$ requires (percent): C, 65.9; H, 4.18.

The structure was confirmed by mass spectroscopy.

(d) 2,9 - dicarboxydichromono[7,6-b:6',7'-d]cyclopentane disodium salt: To a solution of 0.088 part of sodium bicarbonate in 50 parts of water were added 0.215 part of 2,9 - dicarboxydichromono[7,6-b:6',7'-d]cyclopentane hydrate. The solution was filtered and freeze dried to give 2,9-dicarboxydichromono[7,6-b:6',7'-d]cyclopentane disodium salt.

EXAMPLE 4

Bis(2-carboxychromono[g])[3,2:5,6] (4,4-dimethyl pyran)

(a) 2,7 diacetyl-3,6-dihydroxy-9,9-dimethyl xanthene: An intimate mixture of 13 parts of 3,6-diacetoxy-9,9-dimethyl xanthene, 60 parts of anhydrous aluminium chloride and 13 parts of sodium chloride was heated at 140° C. for 2 hours. After cooling, the mixture was hydrolysed with ice and hydrochloric acid.

The resulting solid was filtered off, washed with water, dried and crystallised from dioxan as a white solid comprising 8 parts of 2,7-diacetyl-3,6-dihydroxy-9,9-dimethyl xanthene, M.P. 284–6° C.

Analysis.—Found (percent): C, 69.5; H, 5.53. $C_{19}H_{18}O_5$ requires (percent): C, 69.9; H, 5.52.

The structure was confirmed by mass spectroscopy.

(b) Bis(2 - ethoxycarbonyl chromono[g])[3,2:5,6] (4,4-dimethyl pyran) hemihydrate: To a solution of sodium ethoxide (prepared from 3.68 parts of sodium and 100 parts of ethanol) was added a slurry of 6.52 parts of 2,7-diacetyl-3,6-dihydroxy-9,9-dimethyl xanthene and 14.6 parts of diethyl oxalate in 100 parts of dioxan. The mixture was stirred and refluxed for 5 hours.

After cooling the mixture was poured into water and the solution was extracted with diethyl ether. The aqueous extracts were acidified with hydrochloric acid and extracted with diethyl ether. The ethereal solution was washed with water, dried over sodium sulphate, filtered and evaporated to give a semi-solid to which ethanol was added. The solid material was filtered off, and the ethanolic solution was boiled with two drops of concentrated hydrochloric acid for 10 minutes. After cooling the resulting brown solid was filtered off, washed with sodium bicarbonate solution and water, and digested in glacial acetic acid. The resulting yellow solid was filtered off, washed with ether and dried to give 0.5 part of bis(2-ethoxycarbonylchromono[g])[3,2:5,6](4,4-dimethyl pyran) hemihydrate, M.P. 295° C. d.

Analysis. — Found (percent): C, 64.4; H, 4.57. $C_{27}H_{22}O_9 \cdot \frac{1}{2}H_2O$ requires (percent): C, 64.9; H, 4.61.

The structure was confirmed by mass spectroscopy.

(c) Bis(2-carboxy chromono[g][3,2:5,6](4,4-dimethyl pyran): To a suspension of 0.5 part of bis(2-ethoxycarbonyl chromono[g])[3,2:5,6](4,4-dimethyl pyran) hemihydrate in 50 parts of dioxan were added 0.2 part of sodium bicarbonate. Water was then added to the mixture at 100° C. until a solution was obtained. After heating for half an hour at 100° C. the solution was evaporated to dryness. The resulting solid was dissolved in water and the solution was filtered and acidified with hydrochloric acid to give 0.2 part of bis(2-carboxy chromono[g][3,2:5,6](4,4-dimethyl pyran), M.P. 313–6° C. d.

Analysis.—Found: (percent): C, 63.4; H, 3.58. $C_{23}H_{14}O_9$ requires (percent): C, 63.6; H, 3.23.

(d) Bis(2-carboxy chromono[g])[3,2:5,6](4,4-dimethyl pyran) disodium salt: In a solution of 0.1 part of sodium bicarbonate in 50 parts of water were dissolved 0.28 part of bis(2-carboxy chromono[g])[3,2:5,6](4,4-dimethyl pyran). The solution was filtered and freeze dried to give bis(2-carboxy chromono[g])[3,2:5,6](4,4-dimethyl pyran) disodium salt.

EXAMPLE A

The procedure set out below may be used to assess the effectiveness of a compound in inhibiting the release of the pharmacological mediators of anaphylaxis.

In this tests, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Sprague-Dawley rats (male or female) having a body weight of from 100 to 150 gms. are infected subcutaneously at weekly intervals with N. brasiliensis larvae in doses increasing from about 2000 larvae per animal to 12,000 larvae per animal in order to establish the infection. After 8 weeks the rats are bled by heart puncture and 15–20 mls. of blood collected from each animal. The blood samples are then centrifuged at 3500 r.p.m. for 30 minutes in order to remove the blood cells from the blood plasma. The serum is collected and used to provide a serum containing N. brasiliensis antibody. A pilot sensitivity test is carried out to determine the least quantity of serum required to give a skin weal in control animals in the test described below of 2 cm. diameter. It has been found that optimum sensitivity of rats in the body weight range 100–130 gms. is obtained using a serum diluted with eight parts of physiological saline solution. This diluted solution is called antibody serum. A The antigen to react with the antibody in serum A is prepared by removing N. brasiliensis worms from the gut of the infested rats, centrifuging the homogenate and collecting the supernatant liquor. The liquor is diluted with saline to give a protein content of 1 mg./ml. and is known as solution.

Sprague-Dawley rats in the body weight range 100 to 130 gms. are sensitised by intra dermal injection of 0.1 mls. of serum A into the right flank. Sensitivity is allowed to develop for 24 hours and the rats are then injected intravenously with 1 ml./100 gms. body weight of a mixture of solution B (0.25 mls.), Evans Blue dye solution (0.25 mls.) and the solution of the compound under test (0.5 mls. varying percentages of active matter). Insoluble compounds are administered as a separate intraperitoneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins removed and reversed. The intensity of the anaphylactic reaction is assessed by comparing the size of the characteristic blue weal produced by spread of the Evan Blue dye from the sensitisation site, with the size of the weal in the control animals. The size of the weal is rated as 0 (no weal detected, i.e. 100% inhibition) to 4 (no difference in size of weal, i.e. no inhibition) and the percentage inhibition for each dose level calculated as:

Percent inhibition
$$= \frac{(\text{Control group score} - \text{treated group score}) \times 100}{\text{Control group score}}$$

The percentage inhibitions for the various dose levels are plotted graphically for each compound. From these graphs the dosage required to achieve a 50% inhibition of the anaphylactic reaction ($ID_{50}$) may be determined.

The compounds are also evaluated in the above manner using intestinal and gastric administration of the compound.

We claim:

1. A compound of Formula I,

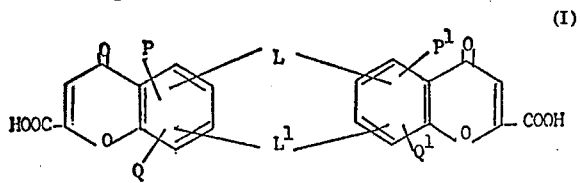

(I)

in which

L and $L^1$, which may be the same or different, each represent a single bond, methylene, mono- or di-lower alkyl methylene, oxygen, sulphur, —NH—, or —OXO—, in which X represents an alkylene chain containing from 1 to 6 carbon atoms and which may optionally be substituted by an —OH group, and P, Q, $P^1$ and $Q^1$ which may be the same or different, are each hydrogen, alkyl, halogen, hydroxy, alkenyl, phenyl or alkoxy, said alkoxy being unsubstituted or substituted by alkoxy or hydroxy, the alkyl, alkenyl, alkoxy and said substituted alkoxy groups containing from 1 to 8 carbon atoms.

2. A compound according to claim 1, wherein L and $L^1$ are joined to ortho positions on the benzene nucleus.

3. A compound according to claim 1, wherein L and $L^1$, together with the 4 carbon atoms in the benzene nuclei to which they are attached, form a ring containing 10 or less members.

4. A compound according to claim 1, wherein L and $L^1$ are selected from a carbon-carbon bond, a methylene group, a mono- or di-lower alkyl methylene group, an oxygen or sulphur atom, an —NH— group, or a group —OCH$_2$CHOHCH$_2$O—.

5. A compound according to claim 1, wherein P, Q, $P^1$ and $Q^1$ are all hydrogen.

6. A compound according to claim 1, which is bis(2-carboxychromone[h])[6,7:10,9](3 - hydroxy - 1,5 - dioxacyclo decane).

7. A compound according to claim 1, which is 2,9-dicarboxy dichromono[7,6-b:6′,7′-d]furan.

8. A compound according to claim 1, which is 2,9-dicarboxychromono[7,6-b:6′,7′-d]cyclopentane.

9. A compound according to claim 1, which is bis(2-carboxychromono[g])[3,2:5,6](4,4-dimethyl pyran).

10. A compound according to claim 1 in the form of a pharmaceutically acceptable salt thereof.

References Cited
UNITED STATES PATENTS 3,419,578  12/1968  Fitzmaurice et al. __ 260—345.2

JOHN M. FORD, Primary Examiner

U.S. Cl. X.R.

260—345.5, 592; 424—283

UNITED STATES PATENT OFFICE
CERTIFICATE OF CORRECTION

Patent No. 3,773,794   Dated November 20, 1973

Inventor(s) ALBERT CHAMBERS, PETER BENNETT JOHNSON and THOMAS BRIAN LEE

It is certified that error appears in the above-identified patent and that said Letters Patent are hereby corrected as shown below:

-- Foreign Application Priority Data

August 1, 1970        Great Britain        37273/70 -- should appear in the heading of the Title page

Signed and sealed this 16th day of April 1974.

(SEAL)
Attest:

EDWARD M. FLETCHER, JR.          C. MARSHALL DANN
Attesting Officer                Commissioner of Patents